(12) United States Patent
Kim et al.

(10) Patent No.: US 11,644,712 B2
(45) Date of Patent: *May 9, 2023

(54) COLOR FILTER PANEL, DISPLAY APPARATUS AND METHOD OF MANUFACTURING THE SAME

(71) Applicant: SAMSUNG DISPLAY CO., LTD., Yongin-si (KR)

(72) Inventors: Jang-Il Kim, Asan-si (KR); Jeongki Kim, Hwaseong-si (KR); Jong-Hoon Kim, Seoul (KR); Jeaheon Ahn, Hwaseong-si (KR); Myoungjong Lee, Cheonan-si (KR); Seongyeon Lee, Asan-si (KR); Si-Wan Jeon, Hwaseong-si (KR); Seok-Joon Hong, Seongnam-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/713,027

(22) Filed: Apr. 4, 2022

(65) Prior Publication Data

US 2022/0221756 A1 Jul. 14, 2022

Related U.S. Application Data

(63) Continuation of application No. 16/896,852, filed on Jun. 9, 2020, now Pat. No. 11,294,221.

(30) Foreign Application Priority Data

Jul. 24, 2019 (KR) .................... 10-2019-0089481

(51) Int. Cl.
*G09G 3/36* (2006.01)
*G09G 3/30* (2006.01)
(Continued)

(52) U.S. Cl.
CPC .. *G02F 1/133514* (2013.01); *G02F 1/133512* (2013.01); *G02F 1/13624* (2013.01); *G02F 1/133614* (2021.01)

(58) Field of Classification Search
CPC ......... G02F 1/133512; G02F 1/133514; G02F 1/133614; G02F 1/13624
See application file for complete search history.

(56) References Cited

U.S. PATENT DOCUMENTS

2017/0076678 A1 3/2017 Lee et al.
2017/0090247 A1 3/2017 Lee et al.
(Continued)

FOREIGN PATENT DOCUMENTS

| KR | 10-2018-0002933 | 1/2018 |
| KR | 10-2018-0044474 | 5/2018 |
| KR | 10-2020-0059369 | 5/2020 |

*Primary Examiner* — Sanghyuk Park
(74) *Attorney, Agent, or Firm* — Lewis Roca Rothgerber Christie LLP

(57) ABSTRACT

A color filter panel includes: a base substrate having a first pixel area, a second pixel area, and a light blocking area between the first pixel area and the second pixel area; a first color filter on the base substrate in the first pixel area; a second color filter on the base substrate in the second pixel area; a first photoluminescence pattern on the first color filter in the first pixel area and configured to convert a color of light; and a second photoluminescence pattern on the second color filter in the second pixel area and configured to convert a color of light. The second photoluminescence pattern partially overlaps the first photoluminescence pattern in the light blocking area.

20 Claims, 10 Drawing Sheets

(51) Int. Cl.
    *G02F 1/1335* (2006.01)
    *G02F 1/1362* (2006.01)

(56) References Cited

U.S. PATENT DOCUMENTS

| | | |
|---|---|---|
| 2017/0153366 A1 | 6/2017 | Park et al. |
| 2017/0179438 A1* | 6/2017 | Xu ..................... H01L 27/3213 |
| 2017/0242292 A1 | 8/2017 | Jeon et al. |

* cited by examiner

COLOR FILTER PANEL, DISPLAY APPARATUS AND METHOD OF MANUFACTURING THE SAME

CROSS-REFERENCE TO RELATED APPLICATIONS

This application is a continuation of U.S. patent application Ser. No. 16/896,852, filed Jun. 9, 2020, which claims priority to and the benefit of Korean Patent Application No. 10-2019-0089481, filed on Jul. 24, 2019, the entire content of both of which is incorporated herein by reference.

BACKGROUND

1. Field

Aspects of exemplary embodiments of the present invention relate to a color filter panel, a display apparatus including the color filter panel, and a method of manufacturing the color filter panel.

2. Description of the Related Art

Recently, display apparatuses having light weight and small size have been manufactured. A cathode ray tube (CRT) display apparatus was previously used due to its performance and competitive price. However, the CRT display apparatus has a weakness with its size and/or portability. Therefore, display apparatuses, such as plasma display (PDP) apparatuses, liquid crystal display (LCD) apparatuses, and organic light emitting (OLED) display apparatuses, have been highly regarded due to their small size, light weight, and low power consumption.

The display apparatus may include a color filter panel having a color conversion structure, such as a quantum dot, to convert a color of light by using photoluminescence. The color conversion structure may impart desired colors to the image, improve color reproducibility of the image, and improve light emission efficiency to improve display quality. However, it is difficult to maintain manufacturing efficiency according to the structure of the color filter panel as the resolution of the display apparatus increases.

SUMMARY

One or more exemplary embodiments of the present invention provides a color filter panel with improved quality.

One or more exemplary embodiments of the present invention also provide a display apparatus including the color filter panel.

One or more exemplary embodiments of the present invention also provide a method of manufacturing the color filter panel.

According to an exemplary embodiment of the present invention, a color filter panel includes: a base substrate having a first pixel area, a second pixel area, and a light blocking area between the first pixel area and the second pixel area; a first color filter on the base substrate in the first pixel area; a second color filter on the base substrate in the second pixel area; a first photoluminescence pattern on the first color filter in the first pixel area and configured to convert a color of light; and a second photoluminescence pattern on the second color filter in the second pixel area and configured to convert a color of light. The second photoluminescence pattern partially overlaps the first photoluminescence pattern in the light blocking area.

The first photoluminescence pattern may include a red quantum dot or a red phosphor, and the second photoluminescence pattern may include a green quantum dot or a green phosphor. The first color filter may be a red color filter, and the second color filter may be a green color filter.

The base substrate may have a third pixel area, and the color filter panel may further include a blue color filter on the base substrate in the third pixel area and in the light blocking area.

The color filter panel may further include a transparent pattern on the blue color filter in the third pixel area The color filter panel may further include a first insulating layer between the first color filter and the first photoluminescence pattern, between the second color filter and the second photoluminescence pattern, and between the blue color filter and the transparent pattern.

The transparent pattern may partially overlap the second photoluminescence pattern and may partially contact the second photoluminescence pattern in the light blocking area between the third pixel area and the second pixel area.

The color filter panel may further include a first light blocking pattern on the blue color filter in the light blocking area, and a width of the first light blocking pattern may be smaller than a width of the blue color filter in the light blocking area.

The color filter panel may further include: a second insulating layer on the first and second photoluminescence patterns; and a second light blocking pattern on the second insulating layer in the light blocking area. A portion of the second photoluminescence pattern overlapping the second light blocking pattern may have a flat portion that is flattened through a planarization process.

The first color filter and the second color filter may be spaced apart from each other in the light blocking area, the first color filter and the second color filter may form a groove in the light blocking area, and a portion of at least one of the first photoluminescence pattern and the second photoluminescence pattern may be in the groove.

A portion of the second photoluminescence pattern overlapping the groove in the light blocking area may have a flat portion that is flattened through a planarization process.

According to an exemplary embodiment of the present invention, a display apparatus includes: a backplane panel including a thin film transistor; and a color filter panel on the backplane panel. The color filter panel includes: a base substrate having a first pixel area, a second pixel area, and a light blocking area between the first pixel area and the second pixel area; a first color filter on the base substrate in the first pixel area; a second color filter on the base substrate in the second pixel area; a first photoluminescence pattern on the first color filter in the first pixel area and configured to convert a color of light; and a second photoluminescence pattern on the second color filter in the second pixel area and configured to convert a color of light. The second photoluminescence pattern may partially overlap the first photoluminescence pattern in the light blocking area.

The backplane panel may further include a backlight unit configured to emit blue light to the first pixel area and the second pixel area.

The first color filter and the second color filter may be spaced apart from each other in the light blocking area, the first color filter and the second color filter may form a groove in the light blocking area, and a portion of at least one of the first photoluminescence pattern and the second photoluminescence pattern may be in the groove.

The base substrate may have a third pixel area, and the color filter panel may further include: a blue color filter on the base substrate in the third pixel area and in the light blocking area; and a transparent pattern on the blue color filter in the third pixel area. The first photoluminescence pattern may include a red quantum dot or a red phosphor, and the second photoluminescence pattern may include a green quantum dot or a green phosphor. The first color filter may be a red color filter, and the second color filter may be a green color filter.

According to an exemplary embodiment of the present invention, a method of manufacturing a display apparatus is provided. The method includes: forming a third color filter on a base substrate in a light blocking area and in a third pixel area; forming a first color filter and a second color filter on the base substrate in a first pixel area and in a second pixel area, respectively; forming a first photoluminescence pattern on the first color filter, the first photoluminescence pattern being configured to convert a color of light; and forming a second photoluminescence pattern on the second color filter, the second photoluminescence pattern being configured to convert a color of light. The first photoluminescence pattern and the second photoluminescence pattern partially overlap each other in the light blocking area.

The first color filter and the second color filter may be spaced apart from each other in the light blocking area.

The method may further include planarizing a protruding portion of the second photoluminescence pattern to form a flat portion after forming the second photoluminescence pattern.

The method may further include forming a first light blocking pattern on the third color filter in the light blocking area before forming the first and second color filters.

The method may further include: forming a first insulating layer on the third color filter, the first color filter, and the second color filter before forming the first photoluminescence pattern; forming a transparent pattern on the first insulating layer in the third pixel area; forming a second insulating layer on the first photoluminescence pattern, the second photoluminescence pattern, and the transparent pattern; and forming a second light blocking pattern on the second insulating layer in the light blocking area.

A width of the first light blocking pattern may be smaller than a width of the third color filter in the light blocking area.

According to the exemplary embodiments of the present invention, because a first photoluminescence pattern and a second photoluminescence pattern and/or first and second color filters are arranged to partially overlap each other and to contact each other in a light blocking area, a sufficient margin in a manufacturing process can be secured, and a defect at an edge portion of the first photoluminescence pattern or the second photoluminescence pattern may be prevented or mitigated.

In addition, even when the first photoluminescence pattern and the second photoluminescence pattern overlap each other, mixing of different color lights between adjacent pixels may be prevented or mitigated by a first light blocking pattern, a second light blocking pattern, and a third color filter in the light blocking area.

In addition, the first color filter and the second color filter are spaced apart from each other in the light blocking area to form a groove. Therefore, a height of a protruding portion of the second photoluminescence pattern may be reduced even when the first photoluminescence pattern and the second photoluminescence pattern partially overlap each other in the light blocking area. Accordingly, a distribution of the profile at the portion where the first photoluminescence pattern and the second photoluminescence pattern overlap may be reduced. Accordingly, process quality can be improved.

In addition, in the light blocking area, the protruding portion formed by the second photoluminescence pattern overlapping the first photoluminescence pattern may be planarized through a planarization process, such as a polishing process. Accordingly, deterioration of the quality in a subsequent process due to excessive protrusion at the portion where the first photoluminescence pattern and the second photoluminescence pattern overlap can be avoided (e.g., a gap margin is reduced by the protrusion when the color filter panel and the backplane panel are bonded together). Accordingly, process quality can be improved.

It is to be understood that both the foregoing general description and the following detailed description are exemplary and explanatory and are intended to provide further explanation of the present invention as claimed.

BRIEF DESCRIPTION OF THE DRAWINGS

The above and other aspects and features of the present invention will become more apparent by describing, in detail, exemplary embodiments thereof with reference to the accompanying drawings, in which.

DETAILED DESCRIPTION

Figure 1:
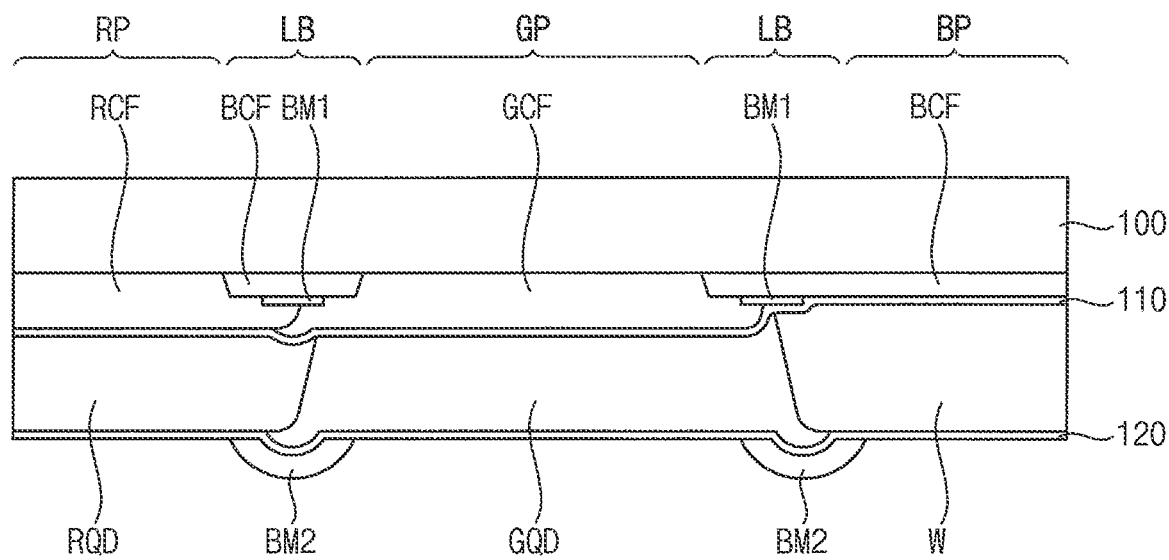
FIG. 1 is a cross-sectional view illustrating a color filter panel according to an exemplary embodiment of the present invention.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively. As used herein, the terms "substantially," "about," and similar terms are used as terms of approximation and not as terms of degree, and are intended to account for the inherent variations in measured or calculated values that would be recognized by those of ordinary skill in the art.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Hereinafter, embodiments of the present invention will be explained, in detail, with reference to the accompanying drawings.

FIG. 1 is a cross-sectional view illustrating a color filter panel according to an exemplary embodiment of the present invention.

Referring to FIG. 1, the color filter panel may include a base substrate 100, a first color filter RCF, a second color filter GCF, a third color filter BCF, a first light blocking pattern BM1, a first insulating layer 110, a first photoluminescence pattern RQD, a second photoluminescence pattern GQD, a transparent pattern W, a second insulating layer 120, and second light blocking pattern BM2.

The base substrate 100 may include (or may be formed of) transparent or opaque insulation materials. For example, the base substrate 100 may include (or may be) a quartz substrate, a synthetic quartz substrate, a calcium fluoride substrate, a fluoride-doped quartz substrate, a soda-lime glass substrate, a non-alkali glass substrate, etc. In some embodiments, the base substrate 100 may include a flexible transparent material, such as a flexible transparent resin material.

The base substrate 100 may include a first pixel area RP, a second pixel area GP, a third pixel area BP, and a light blocking area LB. For example, the first pixel area RP may be a red pixel area in which red light is emitted, the second pixel area GP may be a green pixel area in which green light is emitted, and the third pixel area BP may a blue pixel area in which blue light is emitted. The light blocking area LB may be a non-light emitting area between the first pixel area RP and the second pixel area GP and between the second pixel area GP and the third pixel area BP.

The third color filter BCF may be disposed below the base substrate 100. The third color filter BCF may be a blue color filter. The third color filter BCF may be disposed in the third pixel area BP and in the light blocking area LB.

The first light blocking pattern BM1 may be disposed under the third color filter BCF in the light blocking area LB. The first light blocking pattern BM1 may include a light blocking material. A width of the first light blocking pattern BM1 may be smaller than a width of the third color filter BCF in the light blocking area LB.

The first color filter RCF may be disposed under the base substrate 100 on which the third color filter BCF and the first light blocking pattern BM1 are disposed. The first color filter RCF may be a red color filter. The first color filter RCF may be disposed in the first pixel area RP.

The second color filter GCF may be disposed under the base substrate 100 on which the third color filter BCF, the first light blocking pattern BM1, and the first color filter RCF are disposed. The second color filter GCF may be a green color filter. The second color filter GCF may be disposed in the second pixel area GP.

The first color filter RCF and the second color filter GCF may partially overlap each other in the light blocking area LB.

The first insulating layer 110 may be disposed under the first color filter RCF, the second color filter GCF and the third color filter BCF. That is, the first insulating layer 110 may be between the first color filter RCF and the first photoluminescence pattern RQD, between the second color filter GCF and the second photoluminescence pattern GQD, and between the blue color filter BCF and the transparent pattern W.

The first photoluminescence pattern RQD may be disposed in the first pixel area RP under the first color filter RCF. The first photoluminescence pattern RQD may convert a color of light by using photoluminescence. For example, the first photoluminescence pattern RQD may include a red quantum dot or a red phosphor configured to convert blue light into red light.

The second photoluminescence pattern GQD may be disposed in the second pixel area GP under the second color filter GCF. The second photoluminescence pattern GQD may convert a color of light by using photoluminescence. For example, the second photoluminescence pattern GQD may include green quantum dots or green phosphors configured to convert blue light into green light.

The red or green quantum dot may be a material that has a nano-scale structure and may include several hundred to several thousand atoms. Because the quantum dot is relatively very small in size, a quantum confinement effect may occur. The quantum confinement effect may indicate that an energy band gap of an object (or element or composition) is increased when the object becomes smaller than nano size. When the light having energy higher than that of the band gap is incident to the quantum dot, the quantum dot may absorb the light and may emit a second light having a wavelength (e.g., a specific wavelength) and an energy level at the ground state. The wavelength of the emitted second light may have a value corresponding to the band gap. By adjusting a size and composition of the quantum dot, the emission property of the quantum dot may be controlled according to the quantum confinement effect.

The composition of the quantum dots is not limited to a specific composition, and any suitable composition may be used. For example, the quantum dot may be a quantum dot of Group II-VI elements, Group III-V elements, Group IV elements, or Group IV-VI elements. The Group II elements may be selected from the group consisting of at least one of zinc, cadmium, and mercury. The group III elements may be selected from the group consisting of at least one of aluminum, gallium, and indium. The Group IV elements may be selected from the group consisting of at least one of silicon, germanium, tin, and lead. The Group V elements may be selected from the group consisting of at least one of nitrogen, phosphorus, and arsenic. The Group VI elements may be selected from the group consisting of at least one of sulfur, selenium, and tellurium.

The red phosphor may be one of (Ca, Sr, Ba)S, (Ca, Sr, Ba)$_2$Si$_5$N$_8$, CaAlSiN$_3$, CaMoO$_4$ and Eu$_2$Si$_5$N$_8$, but is not limited thereto.

The green phosphor may be at least one selected from the group consisting of yttrium aluminum garnet (YAG), (Ca, Sr, Ba)$_2$SiO$_4$, SrGa$_2$S$_4$, barium magnesium aluminate (BAM), alpha-SiAlON($\alpha$-SiAlON), beta-SiAlON($\beta$-SiAlON), Ca$_3$Sc$_2$Si$_3$O$_{12}$, Tb$_3$Al$_5$O$_{12}$, BaSiO$_4$, CaAlSiON, and (Sr$_1$-xBax)Si$_2$O$_2$N$_2$, but is not limited thereto.

The transparent pattern W may be disposed in the third pixel area BP under the third color filter BCF. The transparent pattern W may include scattering particles. The scattering particles may be particles of (or including) TiO$_2$, Al$_2$O$_3$, SiO$_2$, or the like, and size of the scattering particles may be similar in size as the red quantum dot particles or the green quantum dot particles.

The second insulating layer 120 may be disposed under the first photoluminescence pattern RQG, the second photoluminescence pattern GQD, and the transparent pattern W.

The second light blocking pattern BM2 may be disposed in the light blocking area LB under the second insulating layer 120. The second light blocking pattern BM2 may block light so that light of different colors is not mixed between adjacent pixel areas.

According to the present embodiment, because the first photoluminescence pattern RQG and the second photoluminescence pattern GQD are arranged to partially overlap each other and to contact each other in the light blocking area LB, a sufficient margin in a manufacturing process can be secured, and a defect at an edge portion of the first photoluminescence pattern RQG and/or the second photoluminescence pattern GQD can be prevented or mitigated.

In addition, even when a portion where the first photoluminescence pattern RQG and the second photoluminescence pattern GQD overlap each other is formed, a problem of color mixing of different color lights between adjacent pixels is prevented or mitigated by the first light blocking pattern BM1, the second light blocking pattern BM2, and the third color filter BCF in the light blocking area LB.

Figure 2:
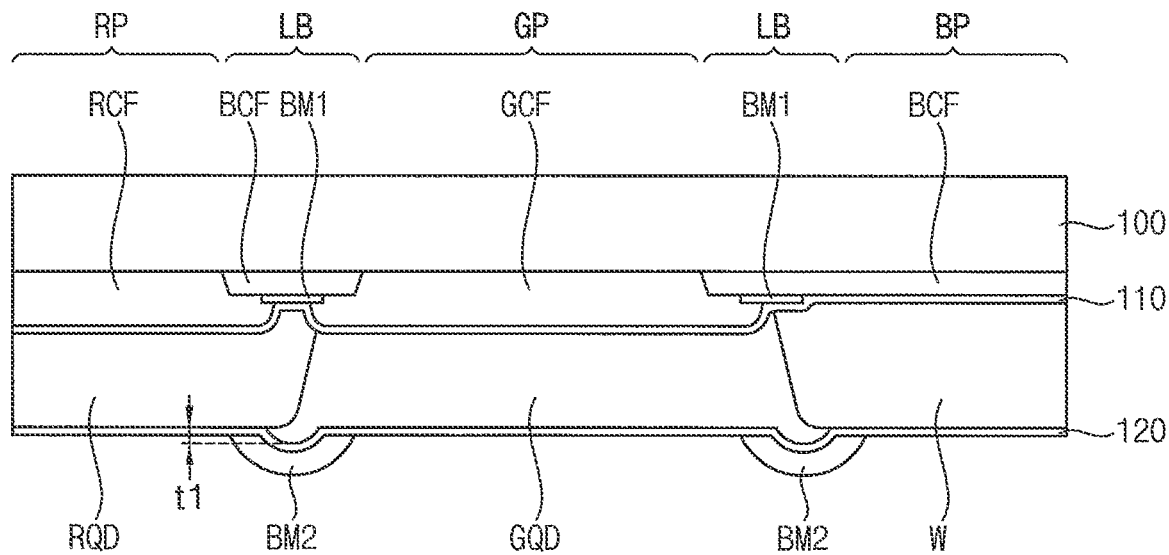
FIG. 2 is a cross-sectional view illustrating a color filter panel according to an exemplary embodiment of the present invention.

FIG. 2 is a cross-sectional view illustrating a color filter panel according to an exemplary embodiment of the present invention.

Referring to FIG. 2, the color filter panel is substantially the same as the color filter panel shown in FIG. 1 except for the area between the first and second color filters. Therefore, repeated description may be omitted.

The color filter panel may include a base substrate 100, a first color filter RCF, a second color filter GCF, a third color filter BCF, a first light blocking pattern BM1, a first insulating layer 110, a first photoluminescence pattern RQD, a second photoluminescence pattern GQD, a transparent pattern W, a second insulating layer 120, and a second light blocking pattern BM2.

The first color filter RCF and the second color filter GCF are spaced apart from each other at the light blocking area LB so that the first color filter RCF and the second color filter GCF are separated from each other. A groove may be formed in the light blocking area LB, and a portion of the first photoluminescence pattern RGD and a portion of the second photoluminescence pattern GQD may be disposed in the groove.

The first color filter RCF and the second color filter GCF are spaced apart from each other in the light blocking area LB to form the groove. Therefore, a height t1 of a protruding portion of the second photoluminescence pattern GQD may be reduced even if the first photoluminescence pattern RQD and the second photoluminescence pattern GQD partially overlap each other in the light blocking area LB. Accordingly, a distribution of the profile at the portion where the first photoluminescence pattern RQD and the second photoluminescence pattern GQD overlap may be reduced. Accordingly, process quality can be improved.

Figure 3:
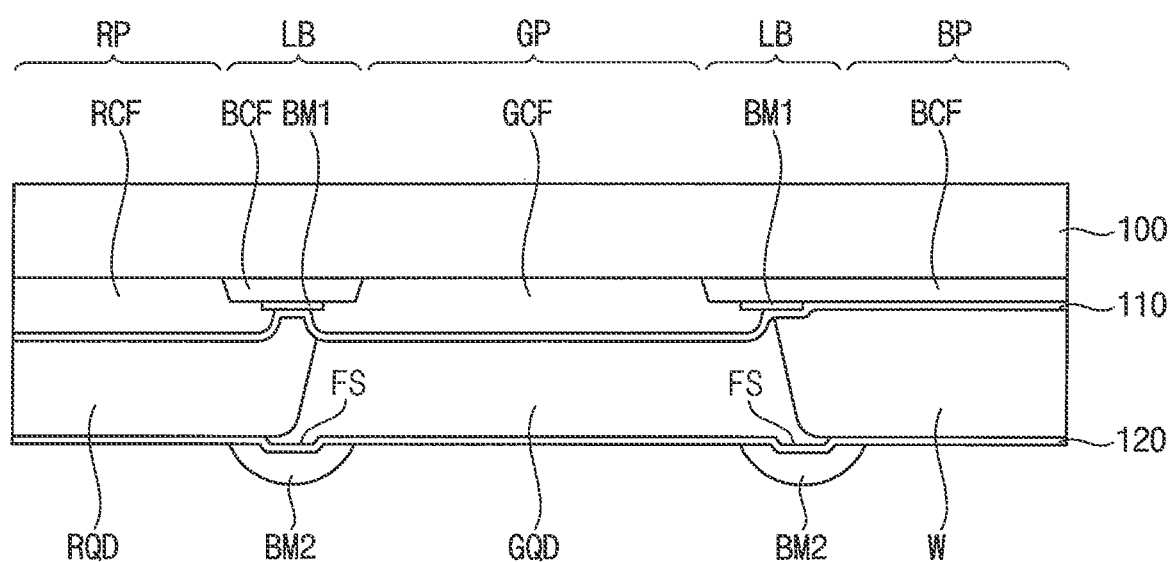
FIG. 3 is a cross-sectional view illustrating a color filter panel according to an exemplary embodiment of the present invention.

FIG. 3 is a cross-sectional view illustrating a color filter panel according to an exemplary embodiment of the present invention.

Referring to FIG. 3, the color filter panel is substantially the same as the color filter panel shown in FIG. 2 except for a flat portion of the second photoluminescence pattern. Therefore, repeated descriptions may be omitted.

The color filter panel may include a base substrate 100, a first color filter RCF, a second color filter GCF, a third color filter BCF, a first light shielding pattern BM1, a first insulating layer 110, a first photoluminescence pattern RQD, a second photoluminescence pattern GQD, a transparent pattern W, a second insulating layer 120, and a second light blocking pattern BM2.

A portion of the second photoluminescence pattern GQD formed in the light blocking area LB may overlap the first photoluminescence pattern RQD (e.g., may overlap a portion of the first photoluminescence pattern RQD). Thus, a protruding portion may be formed at where the second photoluminescence pattern GQD overlaps the first photoluminescence pattern RQD. The protruding portion may be planarized through a planarization process, such as a polishing process. Accordingly, a portion of the second photoluminescence pattern GQD formed in the light blocking area LB may include a flat portion FS planarized through a planarization process.

In the present embodiment, the flat portion FS is formed in (e.g., is a surface of) the second photoluminescence pattern GQD similar to the structure in the embodiment shown in FIG. 2. However, the same structure may be applied to the embodiment shown in FIG. 1. That is, even when the color filters overlap, the flat portion FS may be formed in the second photoluminescence pattern GQD, thereby improving process quality.

Figure 4:
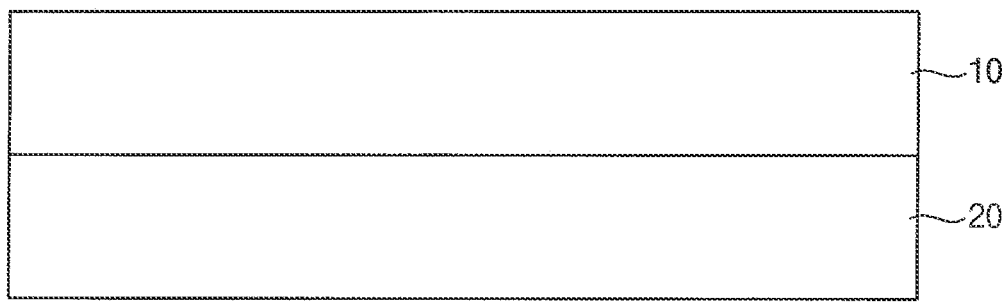
FIG. 4 is a schematic cross-sectional view illustrating a liquid crystal display apparatus including a color filter panel according to an embodiment of the present invention.
Figure 4:

FIG. 4 is a schematic cross-sectional view illustrating a liquid crystal display apparatus including a color filter panel according to an embodiment of the present invention.

Referring to FIG. 4, the display apparatus may include a backlight unit BLV and a display panel disposed on the backlight unit BLV.

The backlight unit BLV may emit blue light and may provide the same (e.g., may provide the blue light) to the display panel.

The display panel may include a backplane panel 20 including a thin film transistor and a color filter panel 10 disposed on the backplane panel 20. The backplane panel 20 may have various suitable structures.

The color filter panel 10 may include a base substrate including a first pixel area, a second pixel area, and a light blocking area between the first pixel area and the second pixel area, a first color filter disposed under the base substrate and disposed in the first pixel area, a second color filter disposed under the base substrate and disposed in the second pixel area, a first photoluminescence pattern disposed in the first pixel area under the first color filter and configured to convert a color of light by using photoluminescence, a second photoluminescence pattern disposed in the second pixel area under the second color filter, configured to convert a color of light by using photoluminescence, and disposed partially overlapping the first photoluminescence pattern in the light blocking area.

The display apparatus may further include a liquid crystal layer disposed between the backplane panel 20 and the color filter panel 10. The liquid crystal layer may include liquid crystal molecules having optical anisotropy. The liquid crystal molecules may be driven by an electric field to transmit or block (e.g., to selectively transmit or block) light passing through the liquid crystal layer to display an image.

That is, the display apparatus may be a liquid crystal display (QD-LCD) using photoluminescence.

Figure 5:
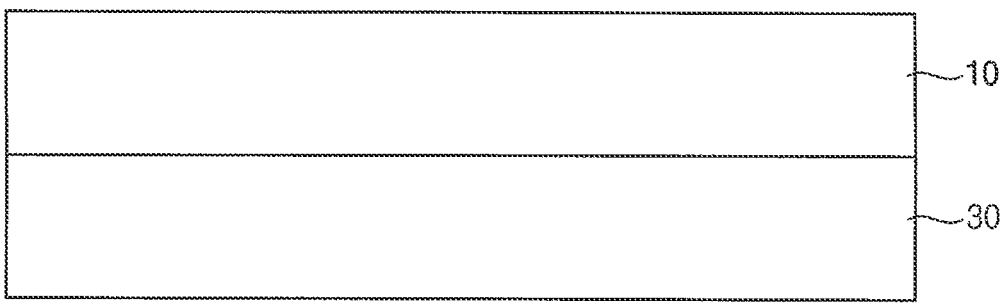
FIG. 5 is a schematic cross-sectional view illustrating an organic light emitting diode display apparatus including a color filter panel according to an embodiment of the present invention.

FIG. 5 is a schematic cross-sectional view illustrating an organic light emitting diode display apparatus including a color filter panel according to an embodiment of the present invention.

Referring to FIG. 5, the display apparatus may include a backplane panel 30 and a color filter panel 10 on the backplane panel 30.

The backplane panel 30 may have various suitable structures including thin film transistors.

The display apparatus may further include an organic light emitting diode element disposed between the backplane panel 30 and the color filter panel 10. The organic light emitting diode element may be an organic light emitting diode that is configured to emit blue light.

That is, the display apparatus may be an organic light emitting display apparatus (QD-OLED) using photoluminescence.

FIGS. 6A to 6H are cross-sectional views illustrating a method of manufacturing the color filter panel shown in FIG. 1. Hereinafter, in consideration of the manufacturing process, for the sake of convenience of explanation, a downward direction is expressed as an upward direction. For example, instead of expression that a third color filter is formed under a base substrate, the third color filter is formed on the base substrate.

Figure 6A:
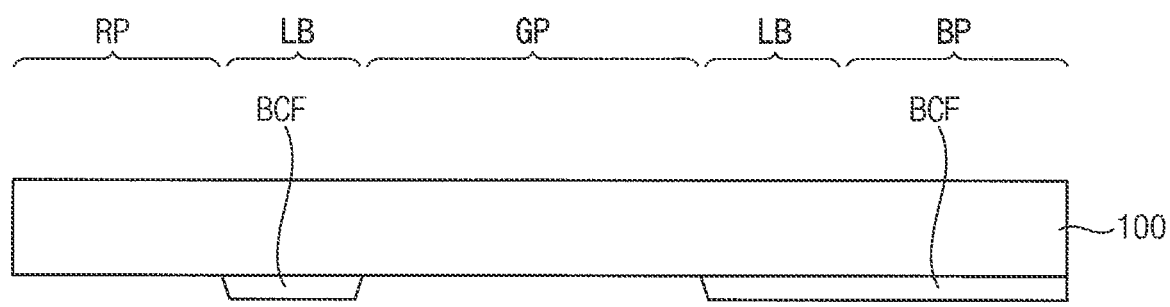
FIGS. 6A to 6H are cross-sectional views illustrating a method of manufacturing the color filter panel shown in FIG. 1.

Referring to FIG. 6A, a third color filter BCF may be formed on the base substrate 100 in the light blocking area LB and in a third pixel area PB.

Figure 6B:
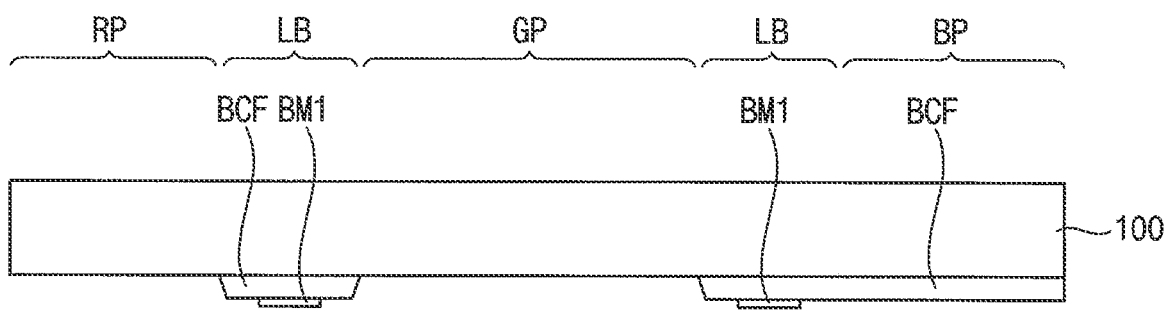

Referring to FIG. 6B, a first light blocking pattern BM1 may be formed on the third color filter BCF in the light blocking area LB.

Figure 6C:
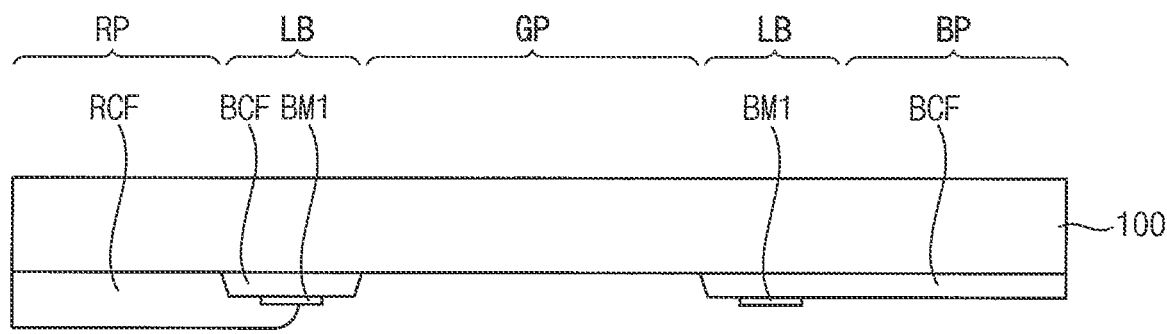

Referring to FIG. 6C, a first color filter RCF may be formed on the base substrate 100 and on (e.g., partially on) the third color filter BCF and on (e.g., partially on) the first light blocking pattern BM1. The first color filter RCF may be formed in (e.g., may extend into) a portion of the light blocking area LB adjacent to the first pixel area RP.

Figure 6D:
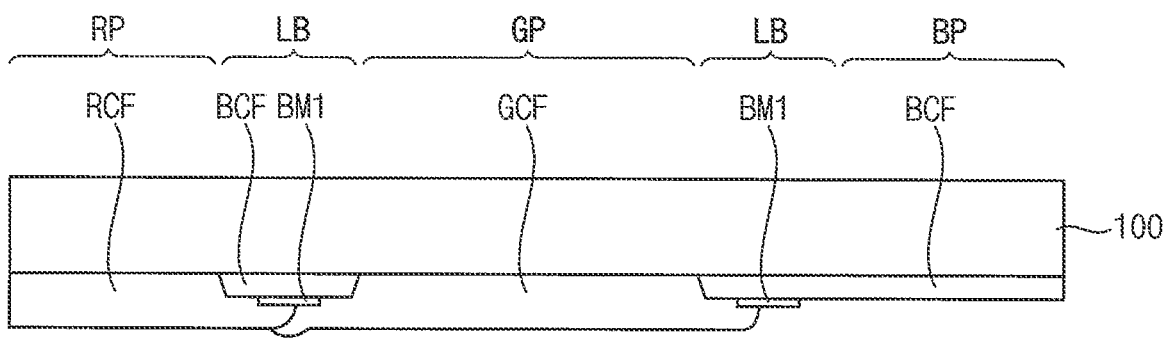

Referring to FIG. 6D, a second color filter GCF may be formed on the base substrate 100 at the second pixel area GP, in a portion of the light blocking area LB adjacent to the second pixel area GP, and on (e.g., partially on) the first color filter RCF. For example, the first color filter RCF and the second color filter GCF may partially overlap each other in the light blocking area LB.

Figure 6E:
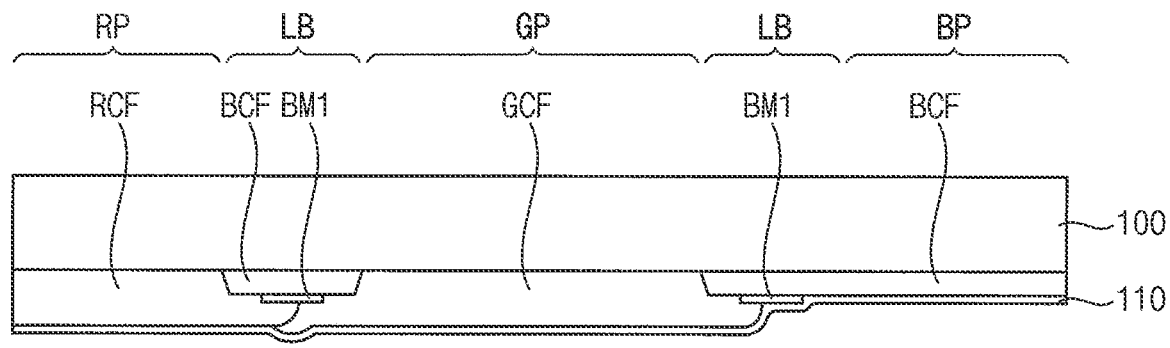

Referring to FIG. 6E, a first insulating layer 110 may be formed on the third color filter BCF, the first color filter RCF, and the second color filter GCF. In some embodiments, the first insulating layer 110 may also be formed on a portion of the first light blocking member BM1 (e.g., on a portion of the first light blocking member BM1 not covered by either the first or second color filter RCF and GCF.

Figure 6F:
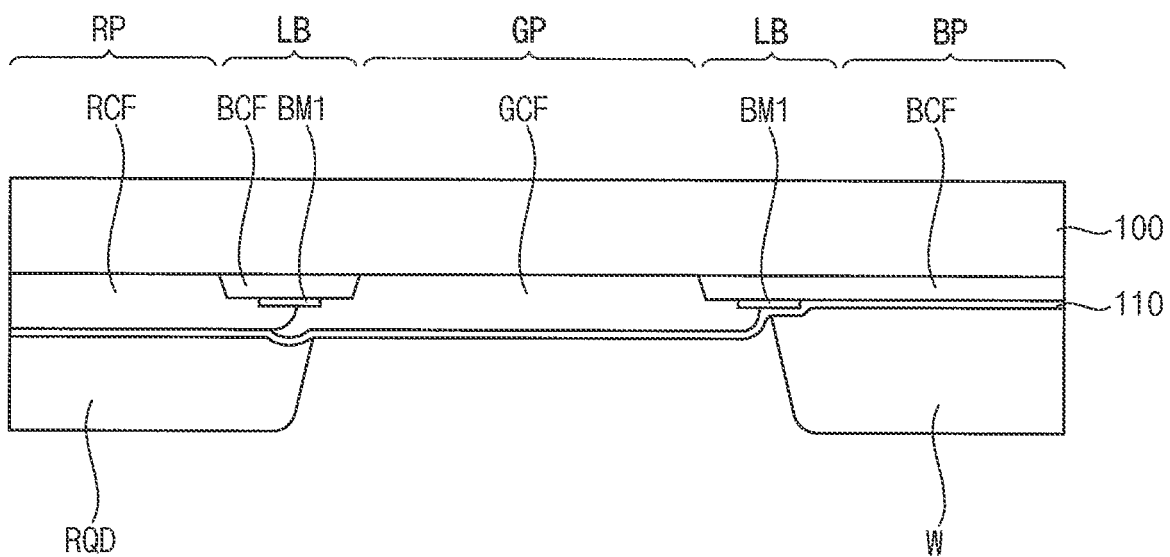

Referring to FIG. 6F, a transparent pattern W and a first photoluminescence pattern RQD may be respectively formed in the third pixel area BP on the first insulating layer 110 and in the first pixel area RP on the first insulating layer 110. The first photoluminescence pattern RQD may be formed in a portion of the light blocking area LB adjacent to the first pixel area RP and in the first pixel area RP.

Figure 6G:
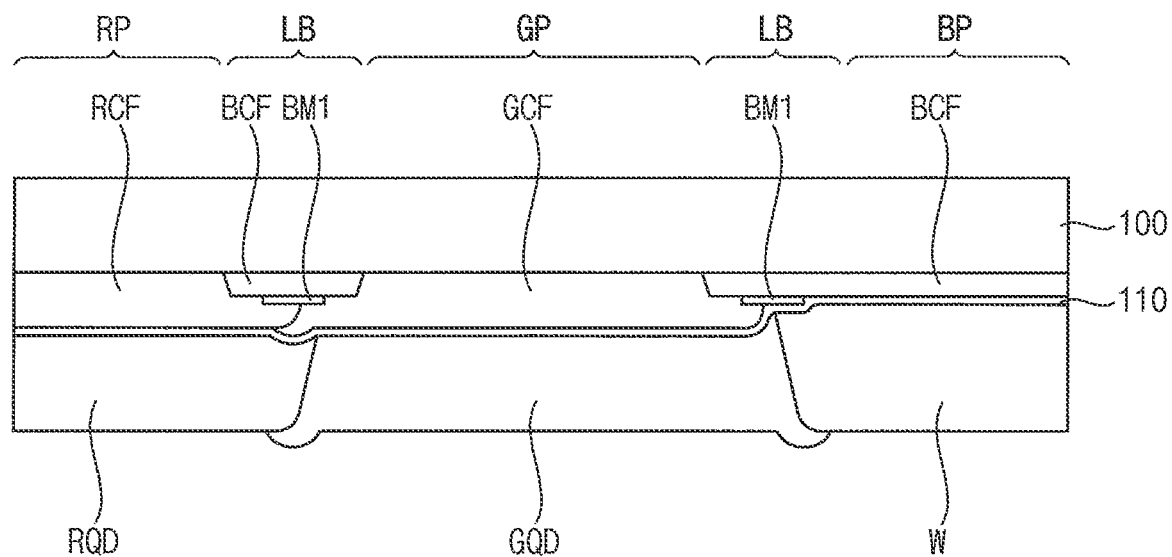

Referring to FIG. 6G, a second photoluminescence pattern GQD may be formed in the second pixel area GP on the first insulating layer 110. The second photoluminescence pattern GQD may be formed in the second pixel area GP and in a portion of the light blocking area LB adjacent to the second pixel area GP.

Accordingly, the first photoluminescence pattern RQD and the second photoluminescence pattern GQD may partially overlap in the light blocking area LB. A similar method may be used in the portion of the light blocking area LB in which the transparent pattern W and the second photoluminescence pattern GQD partially overlap.

Figure 6H:
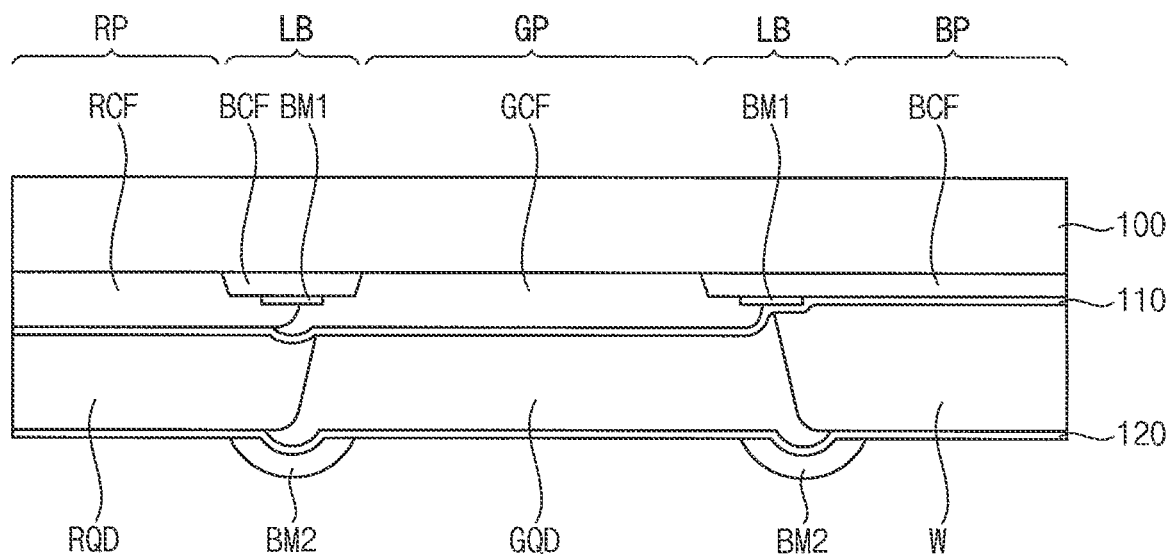

Referring to FIG. 6H, a second insulating layer 120 may be formed on the first photoluminescence pattern RQD, the second photoluminescence pattern GQD, and the transparent pattern W.

A second light blocking pattern BM2 may be formed in the light blocking area LB on the second insulating layer 120. Accordingly, the color filter panel is manufactured.

Figure 7A:
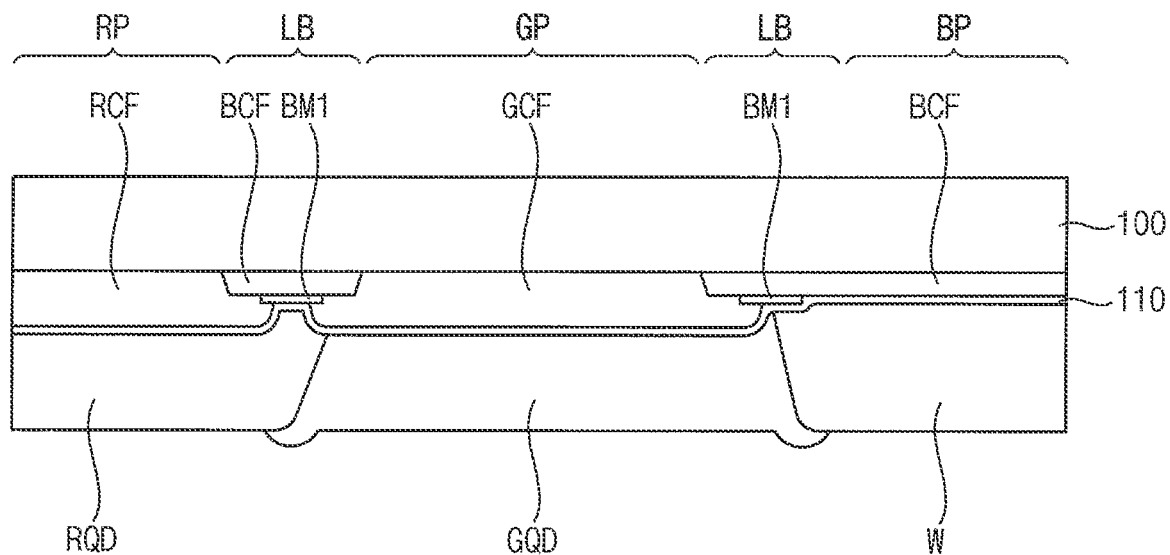
FIGS. 7A to 7C are cross-sectional views illustrating a method of manufacturing the color filter panel shown in FIG. 3.
Figure 7B:
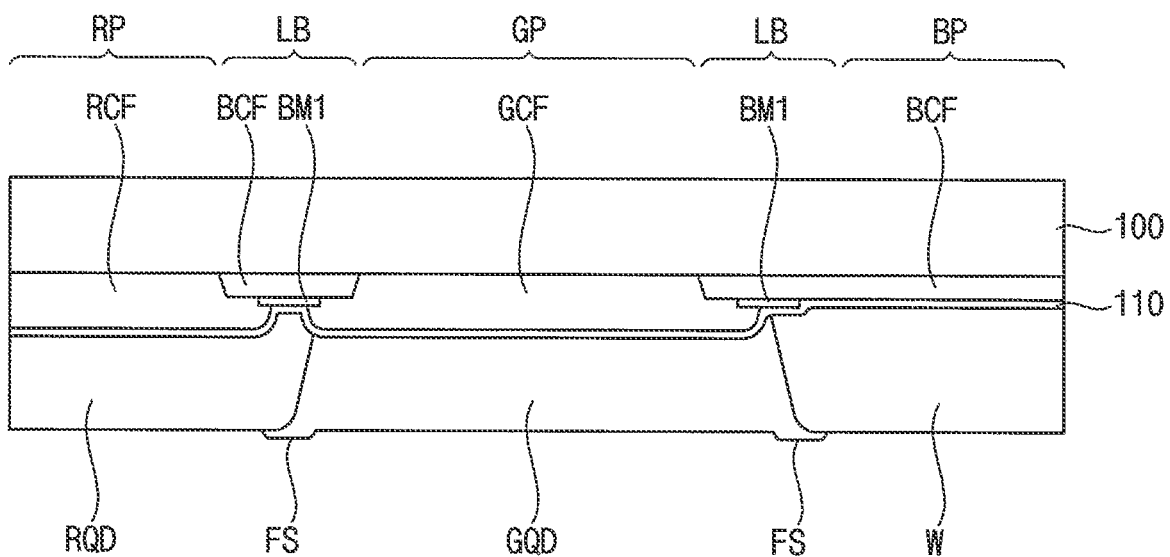
Figure 7C:
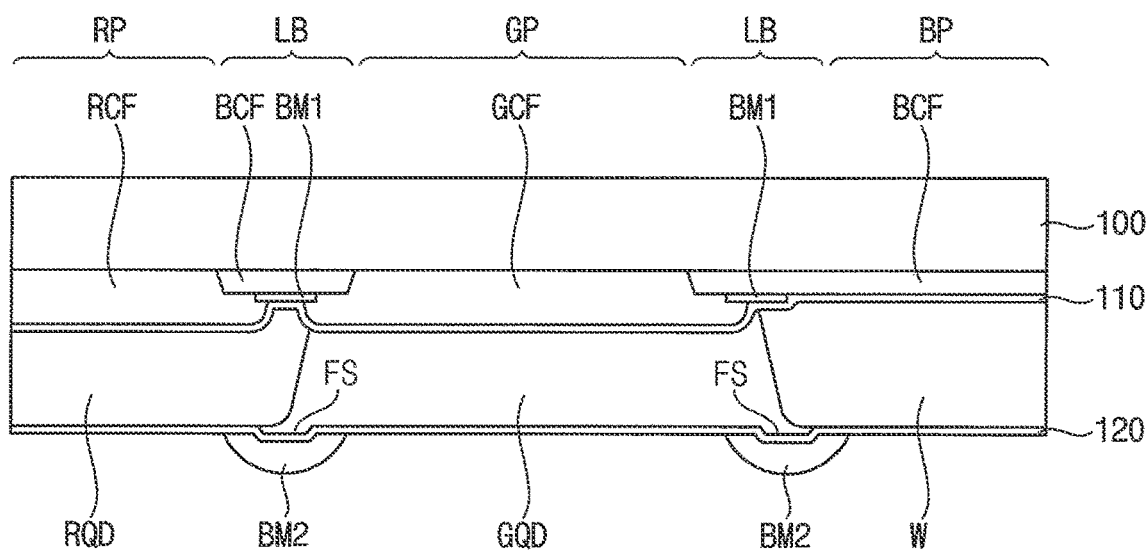

FIGS. 7A to 7C are cross-sectional views illustrating a method of manufacturing the color filter panel shown in FIG. 3. Because the method of manufacturing the color filter panel shown in FIGS. 7A to 7C is substantially the same as the method of manufacturing the color filter panel shown in FIGS. 6A to 6H except for a planarization process and forming a groove. Therefore, repeated descriptions may be omitted.

Referring to FIG. 7A, a third color filter BCF may be formed on the base substrate 100 in a light blocking area LB and in a third pixel area BP. A first blocking pattern BM1 may be formed in the blocking area LB. A second color filter GCF may be formed in a second pixel area GP and in a portion of the light blocking area LB adjacent to the second pixel area GP. A first color filter RCF may be formed in a first pixel area RP and in a portion of the light blocking area LB adjacent to the first pixel area RP. A first insulating layer 110 may be formed on the first, second, and third color filters RCF, GCF, and BCF, and in some embodiments, on a portion of a first light blocking pattern BM1. A transparent pattern W and a first photoluminescence pattern RQD may be respectively formed in the third pixel area BP and in the first pixel area RP. A second photoluminescence pattern GQD may be formed in the second pixel area GP. The first photoluminescence pattern RQD and the second photoluminescence pattern GQD may partially overlap in the light blocking area LB.

In this embodiment, the first color filter RCF and the second color filter GCF may be formed to be spaced apart from each other in the light blocking area LB. The first and second color filters RCF and GCF may form a groove in the light blocking area LB.

Referring to FIG. 7B, a protruding portion of the second photoluminescence pattern GQD may be planarized by using a polishing process or the like. For example, the protruding portion of the second photoluminescence pattern GQD may be flattened to form the flat portion FS. For example, a chemical mechanical polishing (CMP) process using a slurry may be used.

Referring to FIG. 7C, a second insulating layer 120 may be formed on the first and second photoluminescence patterns RQD and GQD and on the transparent pattern W. A second light blocking pattern BM2 may be formed in the light blocking area LB. Accordingly, the color filter panel is manufactured.

Figure 8:
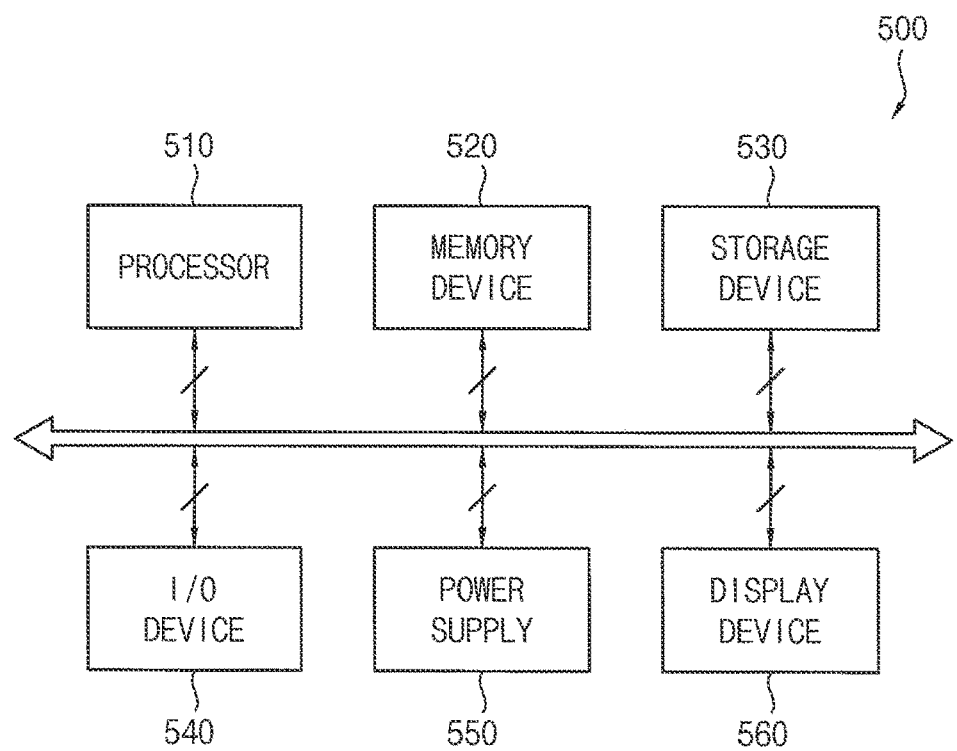
FIG. 8 is a block diagram illustrating an electronic device according to an example embodiment.
Figure 9A:
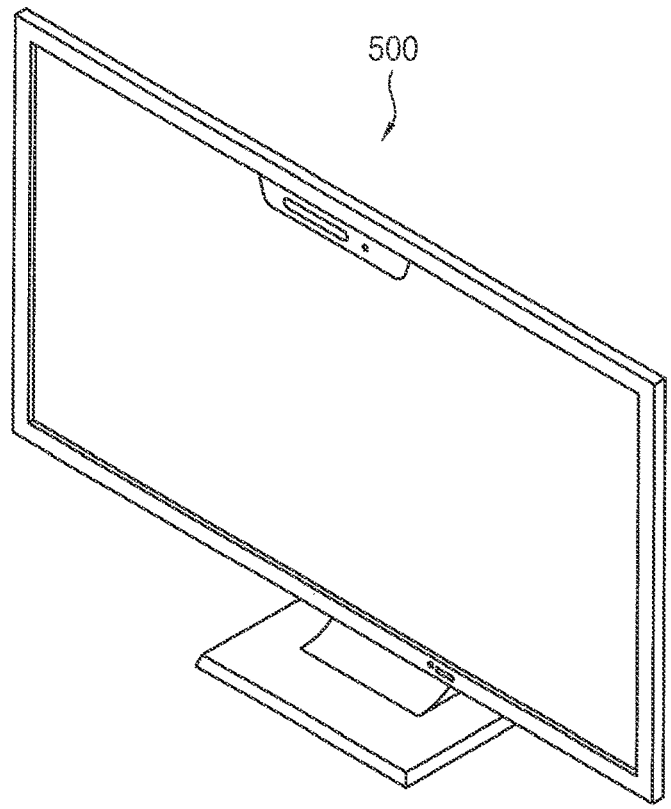
FIG. 9A is a diagram illustrating an example in which the electronic device shown in FIG. 8 is implemented as a television.

FIG. 8 is a block diagram illustrating an electronic device according to example embodiments. FIG. 9A is a diagram illustrating an example in which the electronic device shown in FIG. 8 is implemented as a television, and FIG. 9B is a diagram illustrating an example in which the electronic device shown in FIG. 8 is implemented as a smart phone.

Figure 9B:
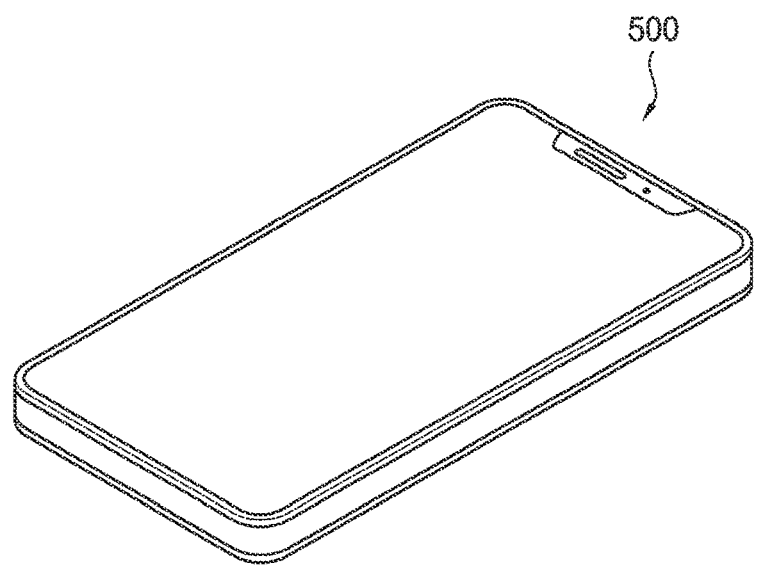
FIG. 9B is a diagram illustrating an example in which the electronic device shown in FIG. 8 is implemented as a smart phone.

Referring to FIGS. 8 through 9B, the electronic device 500 may include a processor 510, a memory device 520, a storage device 530, an input/output (I/O) device 540, a power supply 550, and a display device 560. The display device 560 may correspond to the display apparatus shown in FIG. 4 or 5. In addition, the electronic device 500 may further include a plurality of ports for communicating with a video card, a sound card, a memory card, a universal serial bus (USB) device, other electronic devices, etc. In an example embodiment, as illustrated in FIG. 9A, the electronic device 500 may be implemented as a television. In another example embodiment, as illustrated in FIG. 9B, the electronic device 500 may be implemented as a smart phone. However, the electronic device 500 is not limited thereto. For example, the electronic device 500 may be implemented as a cellular phone, a video phone, a smart pad, a smart watch, a tablet PC, a car navigation system, a computer monitor, a laptop, a head mounted display (HMD), etc.

The processor 510 may perform various computing functions. The processor 510 may be a microprocessor, a central processing unit (CPU), an application processor (AP), etc. The processor 510 may be coupled to other components via an address bus, a control bus, a data bus, etc. Further, the processor 510 may be coupled to an extended bus, such as a peripheral component interconnection (PCI) bus. The memory device 520 may store data for operations of the electronic device 500. For example, the memory device 520 may include at least one non-volatile memory device, such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device, such as a dynamic random access memory (DRAM) device, a static random access memory (SRAM) device, a mobile DRAM device, etc. The storage device 530 may include a solid-state drive (SSD) device, a hard disk drive (HDD) device, a CD-ROM device, etc. The I/O device 540 may include an input device, such as a keyboard, a keypad, a mouse device, a touchpad, a touch screen, etc., and an output device, such as a printer, a speaker, etc. The power supply 550 may provide power for operations of the electronic device 500.

The display device 560 may be coupled to other components via the buses or other suitable communication links. In some example embodiments, the display device 560 may be included in (e.g., may be integrated with) the I/O device 540. As described above, the display device 560 may include a color filter panel. Because a first photoluminescence pattern and a second photoluminescence pattern and/or color filters are arranged to partially overlap each other and to contact each other in a light blocking area, a sufficient margin in a manufacturing process can be secured, and a defect at an edge portion of the first photoluminescence pattern or the second photoluminescence pattern can be prevented or mitigated.

In addition, even when a portion of the first photoluminescence pattern and the second photoluminescence pattern overlap each other, it is possible to prevent (or mitigate) a problem of mixing different color lights between adjacent pixels by a first light blocking pattern, a second light blocking pattern, and a third color filter in the light blocking area.

In addition, the first color filter and the second color filter are spaced apart from each other in the light blocking area to form a groove. Therefore, a height of a portion of the second photoluminescence pattern that protrudes may be reduced even when the first photoluminescence pattern and the second photoluminescence pattern partially overlap in the light blocking area. Accordingly, a distribution of the profile at the portion where the first photoluminescence pattern and the second photoluminescence pattern overlap may be reduced. Accordingly, process quality can be improved.

The present invention can be applied to organic light emitting display devices and various suitable electronic devices including the same. For example, the present invention can be applied to a mobile phone, a smart phone, a video phone, a smart pad, a smart watch, a tablet PC, a car navigation system, a television, a computer monitor, a notebook, and the like.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel aspects and features of the present invention. Accordingly, all such modifications are intended to be included within the scope of the present invention as defined in the claims and their equivalents. Therefore, it is to be understood that the foregoing is illustrative of the present invention and is not to be construed as limiting the present invention to the specific exemplary embodiments disclosed herein, and further, modifications to the disclosed exemplary embodiments, as well as other exemplary embodiments, are intended to be included within the scope of the appended claims. The present invention is defined by the following claims, with equivalents of the claims to be included therein.

What is claimed is:

1. A color filter panel comprising:
a base substrate having a first pixel area, a second pixel area, a light blocking area between the first pixel area and the second pixel area, and a third pixel area;
a first color filter on the base substrate in the first pixel area;
a second color filter on the base substrate in the second pixel area;
a transparent pattern on the base substrate in the third pixel area;
a first photoluminescence pattern on the first color filter in the first pixel area and configured to convert a color of light; and
a second photoluminescence pattern on the second color filter in the second pixel area and configured to convert a color of light, the second photoluminescence pattern partially overlapping the first photoluminescence pattern in the light blocking area,
wherein the first color filter and the second color filter are spaced from each other in the light blocking area,
wherein the first color filter and the second color filter form a groove in the light blocking area, and
wherein a portion of at least one of the first photoluminescence pattern and the second photoluminescence pattern is in the groove.

2. The color filter panel of claim 1, wherein a portion of the second photoluminescence pattern overlapping the groove in the light blocking area has a flat portion that is flattened through a planarization process.

3. The color filter panel of claim 2, wherein the first photoluminescence pattern comprises a red quantum dot or a red phosphor,
wherein the second photoluminescence pattern comprises a green quantum dot or a green phosphor, and
wherein the first color filter is a red color filter, and the second color filter is a green color filter.

4. The color filter panel of claim 2, wherein the first photoluminescence pattern comprises a green quantum dot or a green phosphor,
wherein the second photoluminescence pattern comprises a red quantum dot or a red phosphor, and
wherein the first color filter is a green color filter, and the second color filter is a red color filter.

5. The color filter panel of claim 1,
wherein the color filter panel further comprises a third color filter on the base substrate in the third pixel area and in the light blocking area, and
wherein the transparent pattern is on the third color filter in the third pixel area.

6. The color filter panel of claim 5, wherein the third color filter is a blue color filter.

7. The color filter panel of claim 5, further comprising:
a first insulating layer between the first color filter and the first photoluminescence pattern, between the second color filter and the second photoluminescence pattern, and between the third color filter and the transparent pattern.

8. The color filter panel of claim 7, wherein the transparent pattern partially overlaps the second photoluminescence pattern and partially contacts the second photoluminescence pattern in the light blocking area between the third pixel area and the second pixel area.

9. The color filter panel of claim 8, wherein a portion of the second photoluminescence pattern overlapping the transparent pattern in the light blocking area has a flat portion that is flattened through a planarization process.

10. The color filter panel of claim 5, further comprising a first light blocking pattern on the third color filter in the light blocking area,
wherein a width of the first light blocking pattern is smaller than a width of the third color filter in the light blocking area.

11. The color filter panel of claim 1, further comprising:
a second insulating layer on the first and second photoluminescence patterns; and
a second light blocking pattern on the second insulating layer in the light blocking area.

12. A color filter panel comprising:
a base substrate having a first pixel area, a second pixel area, and a light blocking area between the first pixel area and the second pixel area;
a first color filter on the base substrate in the first pixel area;
a second color filter on the base substrate in the second pixel area;
a first photoluminescence pattern on the first color filter in the first pixel area and configured to convert a color of light; and
a second photoluminescence pattern on the second color filter in the second pixel area and configured to convert a color of light, the second photoluminescence pattern partially overlapping the first photoluminescence pattern in the light blocking area,
wherein a portion of the second photoluminescence pattern overlapping a light blocking pattern in the light blocking area has a flat portion that is flattened through a planarization process.

13. The color filter panel of claim 12, wherein the first photoluminescence pattern comprises a red quantum dot or a red phosphor,
wherein the second photoluminescence pattern comprises a green quantum dot or a green phosphor, and
wherein the first color filter is a red color filter, and the second color filter is a green color filter.

14. The color filter panel of claim 12, wherein the first photoluminescence pattern comprises a green quantum dot or a green phosphor,
wherein the second photoluminescence pattern comprises a red quantum dot or a red phosphor, and
wherein the first color filter is a green color filter, and the second color filter is a red color filter.

15. The color filter panel of claim 12, wherein the base substrate has a third pixel area, and
wherein the color filter panel further comprises:
a third color filter on the base substrate in the third pixel area and in the light blocking area; and
a transparent pattern on the third color filter in the third pixel area.

16. The color filter panel of claim 15, wherein the third color filter is a blue color filter.

17. The color filter panel of claim 15, further comprising:
a first insulating layer between the first color filter and the first photoluminescence pattern, between the second color filter and the second photoluminescence pattern, and between the third color filter and the transparent pattern.

18. The color filter panel of claim 17, wherein the transparent pattern partially overlaps the second photoluminescence pattern and partially contacts the second photoluminescence pattern in the light blocking area between the third pixel area and the second pixel area.

19. The color filter panel of claim 15, further comprising a first light blocking pattern on the third color filter in the light blocking area,
wherein a width of the first light blocking pattern is smaller than a width of the third color filter in the light blocking area.

20. The color filter panel of claim 12, further comprising:
a second insulating layer on the first and second photoluminescence patterns,
wherein the light blocking pattern is on the second insulating layer in the light blocking area.

* * * * *